(12) United States Patent
Terzian et al.

(10) Patent No.: US 7,205,677 B2
(45) Date of Patent: Apr. 17, 2007

(54) AUTOMATED MOTION PROVIDER FOR SELF POWERED CELL PHONES

(75) Inventors: Berj A. Terzian, Newbury, MA (US); Robert Alfred Brodmann, Weehawken, NJ (US)

(73) Assignee: Incelex, LLC, Newbury, MA (US)

( * ) Notice: Subject to any disclaimer, the term of this patent is extended or adjusted under 35 U.S.C. 154(b) by 202 days.

(21) Appl. No.: 11/133,093

(22) Filed: May 19, 2005

(65) Prior Publication Data

US 2006/0264247 A1 Nov. 23, 2006

(51) Int. Cl.
H02K 35/00 (2006.01)

(52) U.S. Cl. .................................... 290/50; 290/1 R

(58) Field of Classification Search .................. None
See application file for complete search history.

(56) References Cited

U.S. PATENT DOCUMENTS

| 584,853 | A | * | 6/1897 | Chellis | ..................... 310/75 R |
|---|---|---|---|---|---|
| 2,921,252 | A | * | 1/1960 | Schiavone | ................... 322/2 R |
| 3,204,110 | A | | 8/1965 | Yoshio | |
| 3,231,749 | A | | 1/1966 | Hinck, III | |
| 4,260,901 | A | | 4/1981 | Woodbridge | |
| 4,423,334 | A | | 12/1983 | Jacobi et al. | |
| 4,821,218 | A | | 4/1989 | Potsch | |
| 5,271,328 | A | | 12/1993 | Boulais et al. | |
| 5,347,186 | A | * | 9/1994 | Konotchick | ................... 310/17 |
| 5,818,132 | A | * | 10/1998 | Konotchick | ................... 310/17 |
| 5,941,692 | A | | 8/1999 | Olney et al. | |
| 6,020,653 | A | | 2/2000 | Woodbridge et al. | |
| 6,172,426 | B1 | | 1/2001 | Galich | |
| 6,291,900 | B1 | * | 9/2001 | Tiemann et al. | ............. 290/1 A |
| 6,791,205 | B2 | | 9/2004 | Woodbridge | |
| 6,812,583 | B2 | * | 11/2004 | Cheung et al. | ............. 290/1 R |
| 6,915,145 | B2 | * | 7/2005 | Tu et al. | ...................... 455/573 |
| 7,126,333 | B2 | * | 10/2006 | Beard et al. | ................ 324/303 |
| 7,148,583 | B1 | * | 12/2006 | Shau et al. | ................. 290/1 R |
| 2004/0004909 | A1 | * | 1/2004 | Fujimori | ..................... 368/204 |
| 2004/0222637 | A1 | | 11/2004 | Bedyak | |
| 2004/0222638 | A1 | | 11/2004 | Bedyak | |

* cited by examiner

*Primary Examiner*—Joseph Waks
(74) *Attorney, Agent, or Firm*—Lucas & Mercanti, LLP

(57) ABSTRACT

An automated provider of predesigned mechanical motion to self powered cell phones is disclosed which avoids the need for users thereof to perform manual manipulations of the phones for power restorative purposes. An optimized kinetic generator of electrical currents for such phones is also disclosed based upon use of a linear wire coil-wrapped tubular raceway through which a permanent magnetic member moves in substantially perpendicular orientation of its magnetic flux relative to the wire coils.

9 Claims, 2 Drawing Sheets

AUTOMATED MOTION PROVIDER FOR SELF POWERED CELL PHONES

BACKGROUND OF THE INVENTION

I. Field of the Invention

This invention relates to self powered cell phones and, more particularly, to a driver system which provides automated physical motion to such phones in order to generate therein kinetic electrical currents during such motion and thereby restore the phones' operating power.

II. Problems in the Prior Art

The present applicants have previously filed co-pending application Ser. No. 11/120,255 entitled SELF POWERED CELL PHONE, the disclosure of which is incorporated herein by reference. That application describes a new system of generating operating power for cell phones without dependence upon external power sources such as AC adaptors, batteries or the like.

Briefly, that new system comprises an internal kinetic electric current generator within the cell phone, for example, a hollow raceway wrapped with multiple coils of conductive wire, with a ball-shaped permanent magnet within the raceway. As the cell phone is put into physical motion, the magnetic ball rolls through the raceway and the resulting passage of magnetic flux through the wire coils generates variable electrical voltages and currents within the wire conductor, in accordance with Faraday's law. Such currents are rectified, stored in internal rechargeable batteries and supplied to the cell phone's operating circuit, thus enabling the phone to be recharged at will whenever desired or required, without reliance upon external electrical or other power.

One of the points made in the prior application is that the generation of restorative electrical current can be carried out by manual motions of the cell phone by a user. However, this will occupy the user's hand and attention for as long as may be required to complete any given recharging time period, especially if the goal is to fully restore the phone's maximum operating power. Therefore, there is a need for freeing the user from being compelled to manually perform the recharging process.

SUMMARY OF THE INVENTION

The present invention satisfies the foregoing needs by providing a driver device and system that automates the recharging process by imparting physical restorative motion to self powered cell phones, without requiring a user to perform that process. This is accomplished by securing the cell phone to a support, coupling the support to an activatable drive system that moves the supported phone in predetermined manner to self generate internal variable electrical currents, and activating and maintaining the drive system in motion for chosen periods of time, thereby restoring the operating power of the phone during such periods. In addition, the drive system is preferably fully mechanized so that it too, like the cell phone, can be operated without any need for or dependence upon external electrical or other source of power. Thus, the preferred embodiment enables unlimited use of self powered cell phones anywhere on the planet at any time.

BRIEF DESCRIPTION OF THE DRAWINGS

Further details of the invention will be readily understood by reference to the accompanying drawings and the following description, wherein.

DETAILED DESCRIPTION OF THE INVENTION

Figure 1:
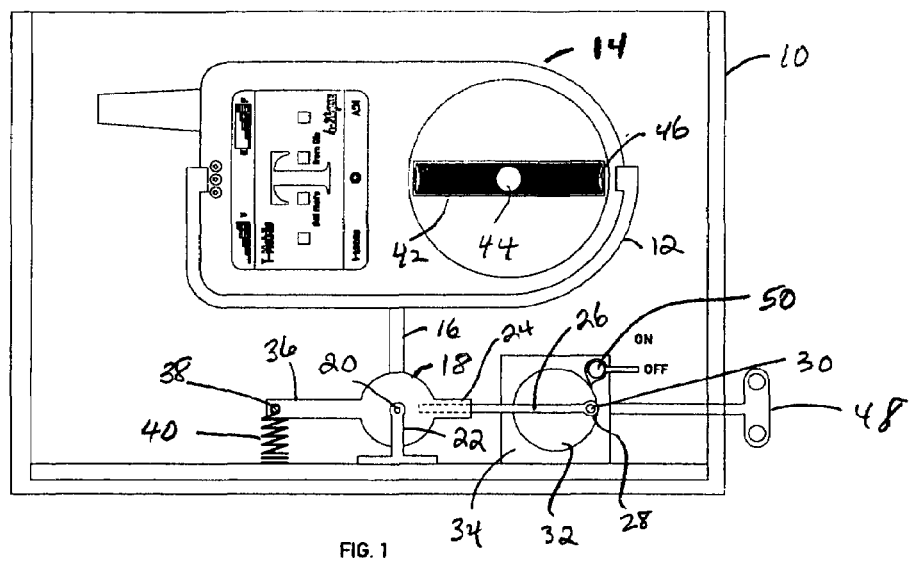
FIG. 1 is a side view of a self powered cell phone secured to a support that is coupled to a mechanical drive system.

Referring to FIG. 1, it illustrates the interior of an outer case or housing 10. Within the case is a support 12 shaped like a carriage or cradle with its opening extended upwardly. A self powered call phone is placed on its side within the support 12. Thus, a plane passing through the thickness of the cell phone is also oriented vertically upward.

Support 12 is attached by link 16 to a disc-shaped hub 18 which is pivotable about a central stud 20 supported by stanchion 22. A similar stud and stanchion are included on the opposite side of hub 18 (not shown) As a result, hub 18 is supported for rotational motion in either clockwise or counter clockwise direction about the central studs 20.

The right side of hub 18 includes an interior channel indicated by the dashed lines 24. Disposed within this channel is a bar-shaped retractable and extendible lever arm 26. Arm 26 extends out from channel 24 to an opposite end 28 which is connected pivotally to a stud 30 positioned at the periphery of a driver wheel 32 supported within bearing block 34 for rotational motion.

The left side of hub 18 includes a bar shaped extension 36 aligned linearly with lever arm 26. The terminal end of extension 36 is attached at 38 to one end of compression spring 40, the opposite end of which is attached to the base of housing 10.

Cell phone 14 includes an interior tubular raceway 42 which is wrapped with conductive wire coils about its exterior. Sealed within raceway 12 is a spherically shaped permanent magnet 44, as previously illustrated and described in applicants' above cited earlier filed application. The interior ends of tubular raceway 42 are provided with resilient bumpers 46 for cushioning purposes.

Key 48 connects to a mainspring mechanical movement used to create and store mechanical energy. Such movements are available, for example, from S. LaRose, Inc., located in Greensboro, N.C. This company's "2002–2004 Keep Book" catalog offers, at pages 261–264, a number of 8- or 9-day windup mechanical clock movements which are compact in size and well suited for use in the present invention. One of such movements is placed within housing 10 and its seconds output gear or shaft is linked to a mating central drive shaft of drive wheel 32. Key 48 is used to wind the movement up in preparation for rotation of drive wheel 32 in clockwise direction. An on/off clutch 50 is included to stop or allow such rotation.

Figure 2:
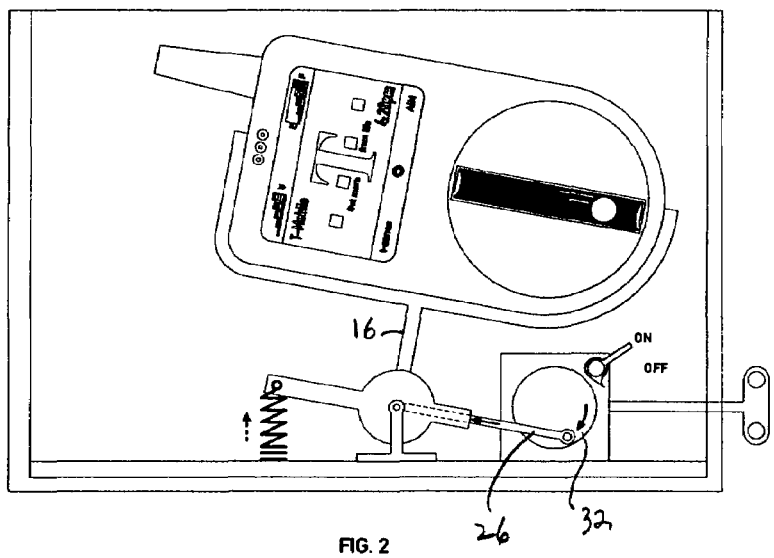
FIG. 2 is a similar view showing the system in one stage of operation after it has been activated.

Referring to FIG. 2, it illustrates a stage in the operation of the invention after the wind up has been completed and the clutch 50 has been pivoted to the ON position. Drive wheel 32 has rotated clockwise from the horizontal position of FIG. 1 to an angularly displaced position, causing lever arm 26 to retract into channel 24 and thereby tilt link 16, support 12 and cell phone 14 downwardly toward the right. As a result, magnetic ball 44 rolls down the correspondingly tilted raceway 42 to its right end, and its travel is gently stopped and cushioned by the bumper 46 at the end of such motion. As the magnetic flux lines pass through the wire coils wrapped around the raceway, electric currents are electromagnetically generated, which can be rectified into DC currents and stored in rechargeable batteries included in the cell phone, as illustrated and described in applicants' earlier filed application.

Figure 3:
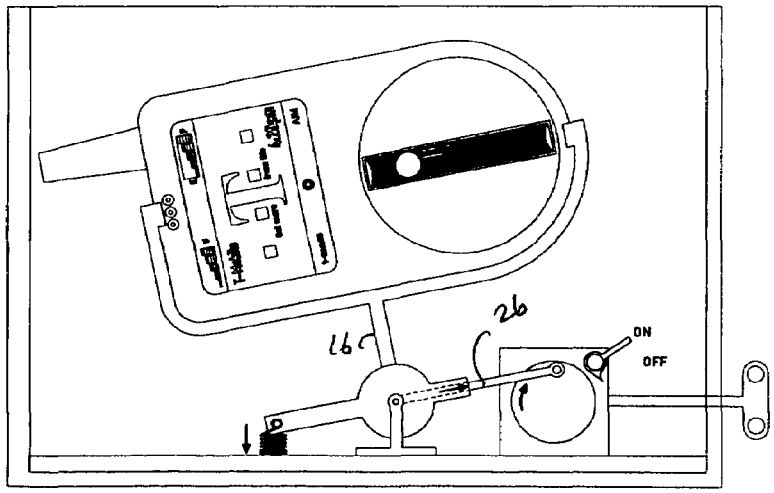
FIG. 3 is a similar view showing the system in a subsequent stage of operation.

FIG. 3 illustrates another stage of operation of the invention. Drive wheel 32 has rotated approximately 270° from its rest position in FIG. 1, causing the lever arm 26 to extend out of channel 24 and tilt link 16, tubular raceway 12, support 12 and cell phone 14 downwardly toward the left. Magnetic ball 44 now rolls down to the left end of raceway 42 whereby electric currents of opposite polarity are generated in the wire coils wrapped around the exterior of the raceway. Again, these currents can be rectified into DC and stored in the cell phone's rechargeable batteries for use as the operating power of the phone, as taught in applicants' earlier filed application.

Figure 4:
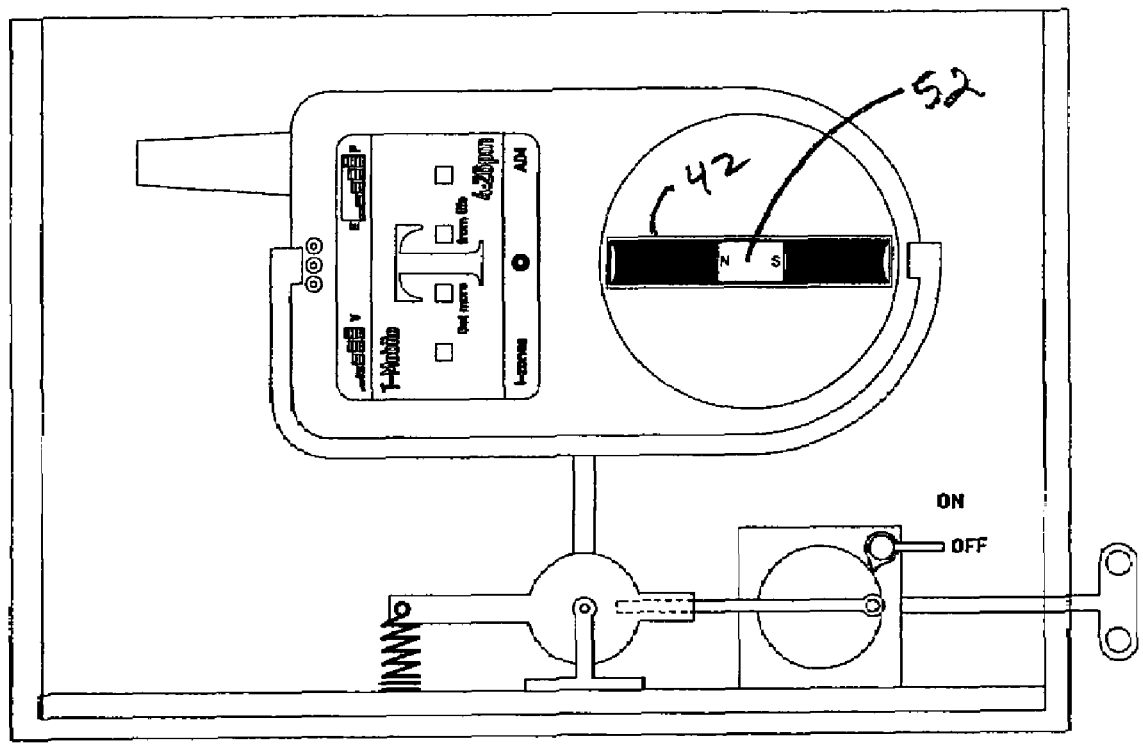
FIG. 4 is a similar view showing a preferred embodiment of a kinetic electric current generator secured to the support of the drive system.

Referring to FIG. 4, it is identical to the previous embodiment of FIGS. 1–3, except that the permanent magnet is configured in the shape of a cylinder 52, instead of the ball 44. The cylindrical magnet has opposite magnetic poles at its ends and the resulting magnetic flux lines, therefore, always remain in a fixed orientation relative to the surrounding wire coils, as the magnet slides through the raceway 42. This orientation establishes substantially complete perpendicularity between the motion of the flux lines and the wire coils to achieve optimum electromagnetic generation of electric currents under Faraday's law. In all of the specific embodiments, spring 40 provides a bias which moderates and smoothes the periodic oscillations of hub 18 and the other components linked to it.

The invention has now been described in terms of its functional principles and illustrative specific embodiments. Many variations of the specific embodiments will be apparent to those skilled in the art. For example, raceways of other shapes than the FIG. 8 and straight tubular form disclosed in applicants' applications. One such shape is a circular loop. If that shape is implemented and unidirectional rotation of it is employed relative to a rolling magnetic member within the loop, the variable electrical currents will always have the same polarity which will avoid having to include rectification of them into DC during current generation. Similar design considerations and alternatives will be obvious to those skilled in the art.

Readers of this application may likely conclude that the epitomy of the present invention's significance is the fact that it enables, for the first time, sustained cell phone usage in remote places on the planet where electricity or batteries are not available. However, this should not be regarded as a limitation of the invention. In the many advanced societies or regions of the world where electrical power or batteries are commonplace, those sources of power can be readily adapted to drive a self powered cell phone in power restorative motion through use of certain devices known as watch winder mechanisms that can be used impart rotational or oscillatory motion to the supported cell phones described herein. Thus, all-in-one type products can be manufactured that contain the purely mechanical windup mainspring type of driver mechanism of the present invention, together with electric motor winder mechanisms that are operated with AC power cords, AC adaptors or batteries.

Such a mechanism is described, for instance, in U.S. Pat. No. 6,254,270, the disclosure of which is incorporated herein by reference. This patent discloses a watch winder which includes a mandrel that is rotationally driven by an electrically powered gear motor. The motor is operated by either an AC power cord or a battery. One of the watch supports is cup-shaped with two slots that hold the watch to be wound (FIGS. 10–12). These slots can be readily dimensioned to hold a self powered cell phone on its side and then rotated to self generate power restorative electrical currents as taught in the present application.

Another example is U.S. Pat. No. 6,543,929, the disclosure of which is incorporated herein by reference. This patent describes a watch winder mechanism which is operated by a battery driven electric motor and which includes an open cup shaped watch holder. The drive system rotates the watch under motor power to an apex stage at which point the watch support is released to undergo inertial and gravitational multiple free swinging oscillations before repetition of the next cycle. This mechanism is readily adaptable to holding a self powered cell phone and oscillating it in reversing clockwise and counter clockwise directions to self generate power restoring electrical currents, as taught in the present application.

Finally, U.S. Pat. No. 6,439,761, the disclosure of which is incorporated herein by reference, describes another watch winder mechanism which is driven by a DC electric motor. Among other things, the patent teaches that the holder for the watch may include spring loaded clamping jaws. The same type of gripping means may be used to hold and support a self powered cell phone for power restorative motion as taught in this application.

It should be understood that all variations or modifications of the specific embodiments disclosed herein are intended to be covered by the ensuing claims and all equivalents thereof.

The following is claimed:

1. An automated motion provider for self powered cell phone which comprises:
   means for securing a self powered cell phone to a mechanical support;
   means for activating the support into predesigned motion which imparts power restorative physical motion to the cell phone when secured to said support; and
   means for maintaining the predesigned motion of the support for controlled time periods, thereby causing the cell phone to self generate electrical currents and restore its operating power during such time periods.

2. A motion provider according to claim 1 wherein the securing means comprises a cradle adapted to receive and hold the self powered cell phone in a predetermined position.

3. A motion provider according to claim 2 wherein the cradle includes an opening which is oriented in a vertically upward direction.

4. A motion provider according to claim 3 wherein the self powered cell phone is received and held on one of its sides in the cradle such that a plane through the cell phone's thickness is oriented in a vertical direction.

5. A motion provider according to claim 1 wherein the activating means comprises a rotatable drive wheel, a lever arm pivotably connected at one end to the periphery of the drive wheel and at the other end retractably positioned for reciprocal retractable and extendible motion within a channel of a hub member linked to the cradle, whereby rotation of the drive wheel is translated into reciprocal motion of the lever arm within the channel and resultant rocking motion of the support and cell phone.

6. A motion provider according to claim 5 wherein the hub member includes an extension linearly aligned with and extending away from the lever arm, the terminal end of the extension being connected to one end of a compression spring, the other end of the spring being attached to a housing of the activating means.

7. A motion provider according to claim 5 wherein the activating means is driven solely by mechanical energy.

8. A motion provider according to claim 7 wherein the mechanical energy is derived from a wound up mainspring of a mechanical clock movement.

9. A motion provider according to claim 7 wherein the maintaining means includes a clutch member which can be manually engaged or released to stop or permit rotation of the drive for selected time periods.

* * * * *